Nov. 18, 1958 F. J. RIEBEL 2,860,693
COMBINATION SPRING SUPPORT AND SPANNER
Filed Jan. 14, 1957 3 Sheets-Sheet 1
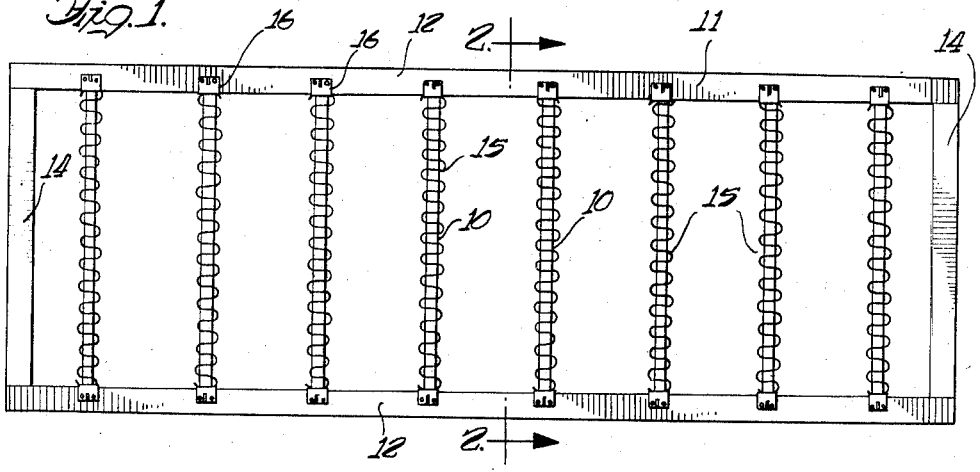
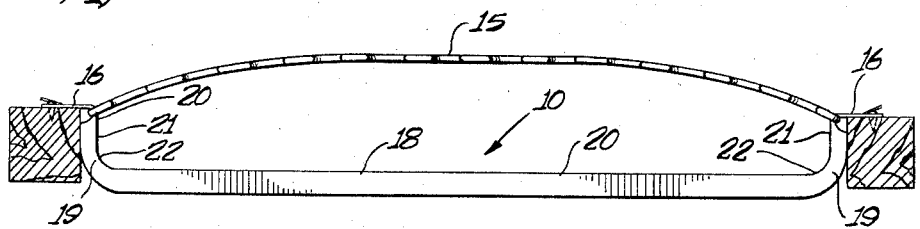
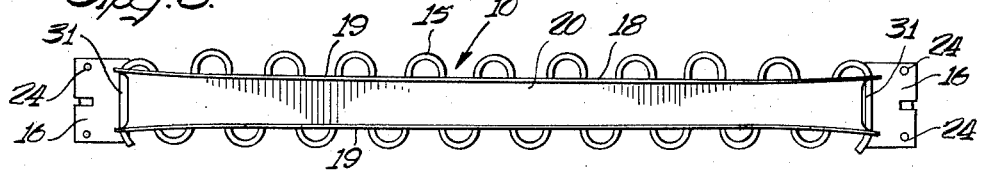
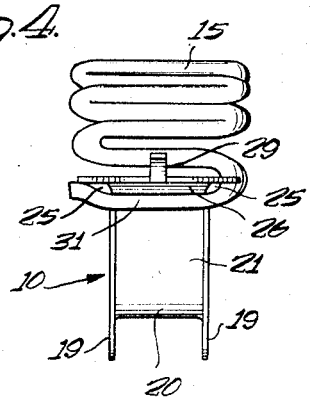
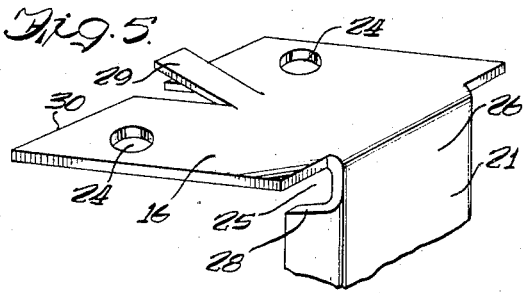
Inventor
Fred J. Riebel
Attorney Nov. 18, 1958  F. J. RIEBEL  2,860,693
COMBINATION SPRING SUPPORT AND SPANNER
Filed Jan. 14, 1957  3 Sheets-Sheet 2
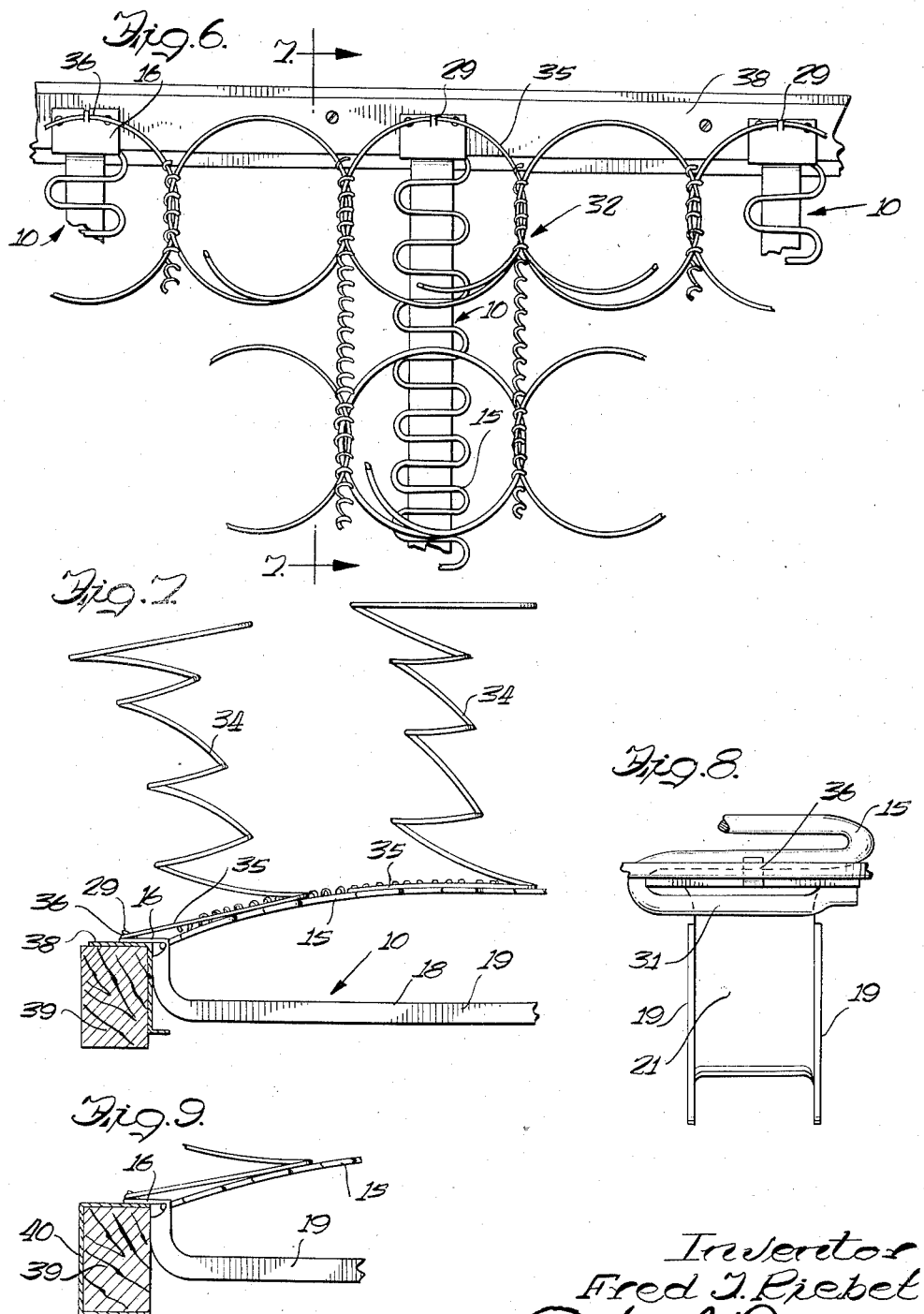

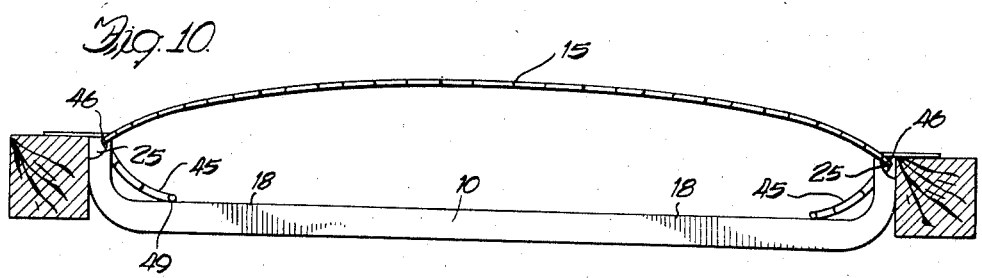
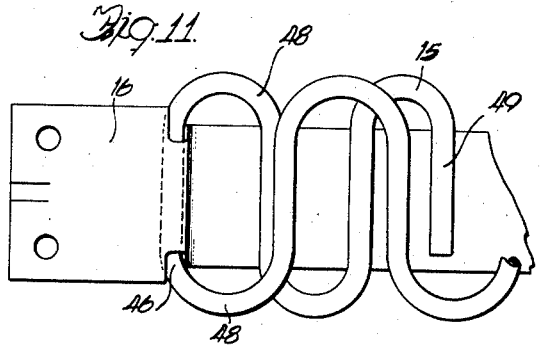
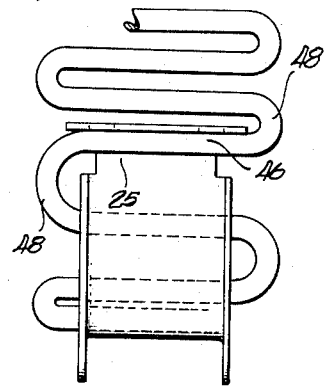
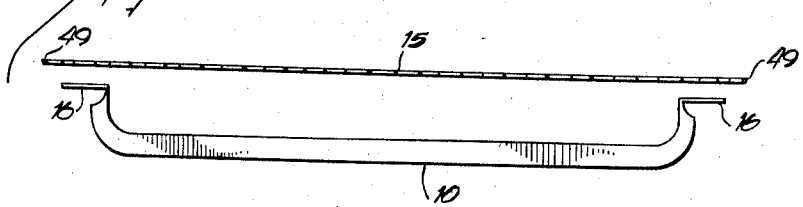
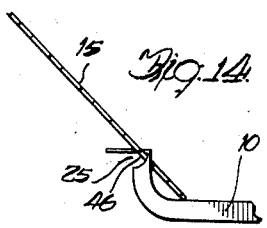
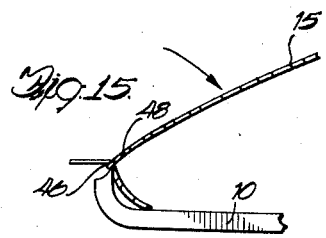

United States Patent Office

2,860,693
Patented Nov. 18, 1958

2,860,693

COMBINATION SPRING SUPPORT AND SPANNER

Fred J. Riebel, Chicago, Ill., assignor to Fred Riebel and Company, Chicago, Ill.

Application January 14, 1957, Serial No. 634,117

15 Claims. (Cl. 155—179)

The present invention relates generally to the upholstery and furniture manufacturing fields. Specifically the invention is embodied in a combination spring support and spanner which has a wide variety of applications in the manufacture of bedding, sofas, chairs, upholstered furniture, and the like.

In recent years a wide usage has been accorded an arched convoluted wire spring. These springs are used as base springs in sofas, stools, and even in beds to underlie the coil springs. To mount the arched springs to the associated furniture frames various types of clips are employed at each end of the springs. The clips are individually nailed to wooden side frames by hand. This, of course, is a time consuming process and, in addition, does not add to the strength of the unit. Also, such a structure makes a heavy wooden frame an essential.

With the foregoing in mind, it is the general object of the present invention to furnish a combination spring support and spanner which reduces the cost of the finished item of furniture while at the same time increasing its quality.

Another object of the invention is to provide a combination spring support and spanner which facilitates the inexpensive construction of all metal furniture.

A further object of the invention is to furnish a combination spring support and spanner which is adaptable to a wide variety of applications in many different types and styles of furniture.

Still another object of the invention is to make possible the manufacture of upholstered furniture in which the role of the wooden frame is reduced to providing a tacking strip and shaping the unit rather than furnishing all of the structural strength as done in conventional furniture manufacture.

Further objects and advantages of the present invention will become apparent as the following description of an illustrative embodiment proceeds, taken in conjunction with the accompanying drawings in which:

Figure 1 is a top view of a couch back frame employing an illustrative spanner spring support as the foundation for the finished upholstered unit.

Fig. 2 is a cross sectional view in enlarged scale of the couch frame shown in Fig. 1 taken along section line 2—2 of Fig. 1.

Fig. 3 is a bottom view of a single spring support and spanner with an associated spring in assembled relationship shown to the same scale as Fig. 2.

Fig. 4 is an end view of the spanner spring support shown in Fig. 3 but in an enlarged scale.

Fig. 5 is an enlarged perspective view of the mounting tab of the spanner spring support.

Fig. 6 is a broken plan view of a couch seat showing the cooperative relationship between the illustrative spanner spring support, the associated convoluted spring, and the superposed coil spring.

Fig. 7 is a broken sectional view of the couch seat shown in Fig. 6 taken along section line 7—7 of Fig. 6.

Fig. 8 is an enlarged partially broken end view of the spring support and spanner as shown in Fig. 7 illustrating the cooperative relationship between the convoluted spring and coil spring at the mounting tab portion of the illustrative spring support and spanner.

Fig. 9 is a partial sectional view similar to Fig. 7 but showing an alternative side frame construction with which the illustrative spring support and spanner may be used.

Fig. 10 is a front elevation of a modified embodiment of the combination spring and spanner.

Fig. 11 is a top view in enlarged scale of the end of the modified spring and spanner combination.

Fig. 12 is an end view of the corner section shown in Fig. 11.

Figs. 13, 14, and 15 are diagrammatic illustrations in front elevation of the assembly of the modified spring and spanner construction illustrating respectively the spring and spanner components, inserting the spring in the spanner, and bending the spring to shape in the spanner.

A basic illustration of an exemplary embodiment of the invention appears in Figs. 1 to 3 of the drawings. A modified embodiment of the invention appears in Figs. 10 through 15 of the drawings. There it will be seen that an arched convoluted spring is secured by a member which serves as a spanner as well as a mount for the spring. The invention stems from the discovery of a structure which serves this twofold purpose of a spring support and structural spanner.

The details of the illustrative spring support spanner 10 will be better understood after first reviewing one practical application. Referring now to Fig. 1, it will be seen that the frame or backbone 11 for a couch back or similar construction has been shown. The perimeter of the frame 11 is made up of wooden side members 12 secured at their ends by wooden cross members 14. In practice an ordinary wooden 2 x 2 may serve as the frame members 12, 14. The spring support spanner 10 in combination with an associated convoluted arched spring 15 are secured between the side members 12 of the frame 11 at spaced intervals. The mounting tabs 16 at the ends of the spring support spanner 10 are nailed or otherwise secured in place on the wooden frame. The resultant construction is substantially stronger than one in which the convoluted springs 15 are secured to the wooden frame side members 12 by means of independent metal clips. In such a construction it is often necessary to add additional wooden cross members in between the two end members 14. In the construction shown, however, the spring support spanner 10 serves to amply strengthen the unit at each location of the convoluted spring 15.

As will be seen in discussing the detailed construction of the spring support spanner 10, it is susceptible of manufacture from a single piece of sheet stock. Referring now to Figs. 2 through 5, it will be seen that the spring support spanner 10 is made up of a body portion 18 in the form of an inverted channel having parallel side legs 19 and a channel base portion 20. The two ends 21 of the body portion 18 are turned upwardly so that the base 20 of the channel forms a radius 22 and then extends at a right angle with the base of the channel body 18.

A unique mounting tab 16 extends from the ends 21 of the body portion 18. The mounting tabs 16 are rectangular in shape and are punched with fastening holes 24 at convenient locations. A recessed spring mounting notch 25 (see Fig. 5) is formed immediately beneath the tab 16 and contemplates the removal of the extreme end portion of the side flanges 19 of the body channel 18. The spring abutting area 26 is defined on the face of the end portion 21 of the channel body 18 between the mounting tab 16 and the base 28 of the mounting notch 25. A coil spring hook 29 is formed at the outer edge 30 of the mounting tab 16 by punching or otherwise angling upwardly a central portion of the mounting tab 16.

As will be seen, particularly in Fig. 4, the convoluted spring 15 has a hooked end portion 31 which is inserted in the mounting notch 25 and abuts against the supporting area 26 of the channel body end 21. The spring support spanner 10 is so proportioned that the convoluted spring 15, when in assembled relationship, exerts a compressive force against the two ends 21 of the channel body 18. Because the flanged portions 19 of the channel turn downwardly, the spanner body 18 readily resists this compressive force while simultaneously securely locking a convoluted spring 15 to the spring support spanner 10. The shoulder 28 of the mounting notch 25 is of sufficient length to prevent the convoluted spring 15 from becoming dislodged when flexed even down to a position parallel with the base portion of the channel body 18.

In the event a maximum compressive load resistance is desired from the spring 10, it has been discovered that this can be achieved by turning the spring ends inwardly at the detent 25 and abutting the lengthened spring end 45 on the upper portion of the channel body 18 as illustrated in Fig. 10. The effect of this construction is to torsionally distort the detent length 46 of the spring 15 with a consequent partial torsional deformation of the adjacent U-shaped ends 48. The end 49 of the spring 15 is firmly planted on the upper portion of the channel body 18, rather than within the detent 25 as shown in the embodiment discused above. The effective length of the spring, that is, the length between the detents remains the same even though the overall length of the spring is increased. It has been found in test that repeated flexing will not break the spring when the ends are reversely folded for mounting. In addition, a very substantial increase in the compressive load required to deflect the spring 15 down to the channel body 18 has been observed.

In order to more clearly appreciate the assembly, which in production is facilitated by suitable tooling, reference may be had to Figures 13 to 15. There it will be seen that the spring 15 exceeds somewhat the total length of the spanner 10 beyond the mounting tabs 16. The ends 49 of the spring 15 are formed in the same manner as the embodiment discussed above, the principal difference being in the length of the spring 15. Normally the additional length is one and one half convolutions of the spring at each end, but this may vary. The spring 15 is then angled obliquely with the spanner 10 as illustrated in Fig. 14, one of the cross pieces 46 of the spring being inserted in the detent 25. The spring is then bent over as illustrated in Fig. 15 torsionally stressing the detent length 46 and its adjacent curved portions 48. The other end of the spring is similarly folded back upon itself by the use of suitable tools in order to effect the configuration illustrated in Fig. 10. Thus, without any change in the basic design, the spanner 10 is adaptable to a different unique spring arrangement with the unexpected improved characteristic of substantially increased compressive load resistance.

Not only does the unique construction of the spring support spanner 10 lend itself to advantageous use with a convoluted spring 15, but by use of the unique mounting tab 29, a coil spring assembly 32 may be superposed over the convoluted springs 15 as is customarily done in the better grade sofas and bed constructions.

Referring now to Fig. 7, it will be seen that the individual coils 34 of the couch spring assembly 32 have a generally circular bottom coil 35. At tangent 36 to the outer periphery of the base coil 35 the mounting tab 29 is engaged to the wire to the base coil 35. The mounting tab 29 may then be tapped lightly with a hammer to securely hold its base coil 35 in assembled relation. This, in turn, anchors the coil spring assembly 35 to the frame.

As pointed out earlier, another unique feature of the spring support spanner 10 is that it enables the construction of all metal furniture on an inexpensive modular basis. As will be seen in Figs. 6 and 7, the mounting tabs 16 have been secured to a metal runner 38 which has an associated wooden nailing strip 39. The metal member 38 provides the principal support for the furniture, the wooden nailing strip 39 serving only to engage upholstery nails or staples.

Referring now to Fig. 9, it will be seen that a different channel runner 40 may be similarly employed as an end runner and secured to the mounting tab 19 of the spring support spanner 10. In the construction shown in Fig. 9, the upholstery is drawn up around the bottom of the channel member 40.

In review, it will be seen that a basic framework for a sofa, or a typical back, such as shown in Fig. 1, or a typical seat, such as shown in Fig. 6, may be readily assembled by using the spring support spanner illustrated. The spanner 10 serves the two-fold purpose of securely locking the convoluted spring 15 firmly in position so that it may be readily handled, and also serves to give unusual lateral strength and support to the completed frame assembly. In addition, the mounting nails or other fasteners employed through the mounting holes 24 of the mounting tab 16 may be quickly inserted after the basic outline of the base frame is defined. Because the spring support spanner 10 may be formed from a single sheet of stock, it is susceptible of inexpensive fabrication by mass production techniques making possible the faster assembly of a higher quality completed item of furniture.

Although a particular embodiment of the invention has been shown and described in full here, there is no intention to thereby limit the invention to the details of such embodiment. On the contrary, the intention is to cover all modifications, alternative embodiments, usages and equivalents of the combination spring support and spanner as fall within the spirit and scope of the invention, specification and appended claims.

This application and its claims are a continuation-in-part of a prior patent application Serial Number 580,895, filed April 26, 1956, now abandoned.

I claim as my invention:

1. A combination spring support and spanner unit for use with an arched spring having transverse end hook portions, the unit being characterized by an elongate spanner portion in the shape of an inverted channel, upturned end portions at each end of the spanner, the end portions being a continuation of the spanner channel section, outwardly extending mounting tabs extending from the terminals of the upturned end portions, mounting means on the mounting tabs for securing the tabs to a preselected structural member, and a notch defined at the intersection of the mounting tab and upturned end portions proportioned to receive and hold the transverse hooked ends of arched spring.

2. A combination spring support and spanner unit for use with a convoluted arched spring formed from a continuous length of wire, the spring having transverse hooked end portions, the unit being characterized by an elongate spanner portion in the shape of an inverted channel, upturned end portions at each end of the spanner, the end portions being a continuation of the spanner channel section, outwardly extending mounting tabs extending from the terminals of the end portions parallel with the spanner portion, mounting means on the mounting tabs for securing the tabs to a preselected structural member, a spring retaining notch defined at the intersection of the mounting tab and end portions proportioned to receive and hold the hooked ends of the convoluted arched spring, and coil spring mounting means on the spanner mounting tabs.

3. A combination spring support and spanner unit for use with a convoluted arched spring formed from a continuous length of wire, the spring having transverse hooked end portions, the unit being characterized by an elongate spanner channel portion, downturned flanges forming the edges of the channel, upturned end portions at each end of the spanner, the end portions being a continuation of the spanner channel, with the channel edge flanges disposed outwardly, outwardly extending mounting tabs extending from the terminals of the upturned end portions, mounting means on the mounting tabs for securing the tabs to a preselected structural member, and a notch defined in the outwardly disposed flanges at the intersection of the mounting tab and end portions proportioned to receive and hold the hooked ends of the convoluted arched spring.

4. A spring support and spanner for use in furniture manufacture, the spanner being characterized by a body portion having upturned end portions and mounting tabs extending outwardly from the upturned ends, the body having a downwardly oriented channel section and the end portions having outwardly facing channel sections, the spring support being characterized by a detent in the body ends at the intersection of the mounting tabs and end portions.

5. A spring support and spanner for use with a convoluted spring having transverse end portions, the spanner being characterized by a body portion having upturned end portions and mounting tabs extending outwardly from the upturned ends, the spring support being characterized by a detent in the body upturned ends at the intersection of the mounting tabs and end portions.

6. A spring support and spanner for use with an arched spring having transverse mounting portions at the ends, the spanner being characterized by a body portion of channel section, upturned end portions on the body portion, mounting tabs extending outwardly from the upturned ends, the spring support being characterized by a notch in the body ends at the intersection of the mounting tabs and end portions.

7. A spring support and spanner comprising, in combination, an elongate body portion, the body portion having downwardly disposed flanges defining a channel section, upturned ends on the body portion with channel flanges disposed outwardly, mounting tabs extending outwardly from the terminals of the upturned ends, and notches defined at the intersection of the outwardly turned flanges and the mounting tabs.

8. A combination spring support and spanner, the spanner being characterized by an elongate body portion terminating in upturned ends, spring retaining means on the upturned ends, and a convoluted elongate spring spanning the area between the body ends and reversely bent at the retaining means, the spring ends abutting the spanner body thereby securing the spring to the spanner and imparting an increased compressive resistance to the spring.

9. A combination spring support and spanner, the spanner being characterized by an elongate body portion terminating in upturned ends, tabs on the upturned ends for mounting the spanner onto frame runners, a spring detent associated with each tab, and a convoluted elongate spring spanning the area between the body ends and reversely bent at the detent, the spring ends abutting the spanner body thereby securing the spring to the spanner and thereby imparting an increased compressive resistance to the spring.

10. An upholstery spring and spanner assembly to traverse a pair of frame members comprising, in combination, an elongate convoluted spring reversely bent at its end portions, a spanner body approximating the effective length of the spring, and support means on the ends of the spanner serving to secure the spanner to its associated frame member and cooperate with the spanner body in securing the reversely bent ends of the spring on the spanner.

11. An upholstery spring and spanner assembly comprising, in combination, a spanner having a channel section running the effective length of the spring, upturned ends on the channel, mounting tabs extending from the upturned ends parallel to the channel section, and a detent beneath each tab to receive a portion of the spring when the spring is reversely bent at its ends so that the spring ends abut the upper portion of the spanner channel section.

12. A combination spring support and spanner comprising, in combination, an elongate spring reversely bent at its end portions, an elongate spanner, and securing means on the ends of the spanner serving to cooperate with the spanner in securing the reversely bent spring ends on the spanner.

13. A combination spring support and spanner unit comprising, in combination, an arched spring having reversely bent end portions, an elongate spanner portion in the shape of an inverted channel, upturned end portions at each end of the spanner, the end portions being a continuation of the spanner channel section, outwardly extending mounting tabs extending from the terminals of the upturned end portions, mounting means on the mounting tabs for securing the tabs to a preselected structural member, and a notch defined at the intersection of the mounting tab and upturned end portions proportioned to receive and hold the reversely bent ends of the arched spring.

14. A combination spring support and spanner unit comprising, in combination, an arched spring having reversely bent ends, an elongate spanner portion in the shape of an inverted channel, upturned end portions at each end of the spanner, the end portions being a continuation of the spanner channel section, outwardly extending mounting tabs extending from the terminals of the end portions parallel with the spanner portion, mounting means on the mounting tabs for securing the tabs to a preselected structural member, a spring retaining notch defined at the intersection of the mounting tab and end portions proportioned to receive and hold the reversely bent ends of the arched spring.

15. A combination spring support and spanner unit comprising, in combination, an arched spring formed from a continuous length of convoluted wire, the spring having reversely bent end portions, an elongate spanner channel portion, downturned flanges forming the edges of the channel, upturned end portions at each end of the spanner, the end portions being a continuation of the spanner channel, with the channel edge flanges disposed outwardly, outwardly extending mounting tabs extending from the terminals of the upturned end portions, mounting means on the mounting tabs for securing the tabs to a preselected structural member, and means defined in the outwardly disposed flanges at the intersection of the mounting tab and end portions proportioned to receive and hold the reversely bent ends of the convoluted arched spring.

References Cited in the file of this patent
UNITED STATES PATENTS
1,164,535     Lewis _____ Dec. 14, 1915